US005647300A

United States Patent [19]
Tucker

[11] Patent Number: 5,647,300
[45] Date of Patent: Jul. 15, 1997

[54] COMPACTED BENTONITE-BASED ABSORBENTS

[75] Inventor: Edward B. Tucker, Romeoville, Ill.

[73] Assignee: First Brands Corporation, Danbury, Conn.

[21] Appl. No.: 551,190

[22] Filed: Oct. 31, 1995

[51] Int. Cl.[6] .......... A01K 1/015

[52] U.S. Cl. .......... 119/173; 119/171; 119/172

[58] Field of Search .......... 119/171, 172, 119/173, 502.8

[56] References Cited

U.S. PATENT DOCUMENTS

| | | | |
|---|---|---|---|
| 3,286,691 | 11/1966 | McFadden | 119/173 |
| 4,187,803 | 2/1980 | Valenta | 119/173 |
| 4,591,581 | 5/1986 | Crampton et al. | 119/173 |
| 4,621,011 | 11/1986 | Fleischer et al. | 428/221 |
| 4,657,881 | 4/1987 | Crampton et al. | 119/173 |
| 4,686,937 | 8/1987 | Rosenfeld | 119/173 |
| 5,062,383 | 11/1991 | Nelson | 119/173 |
| 5,129,365 | 7/1992 | Hughes | 119/171 |
| 5,189,987 | 3/1993 | Stanislowski et al. | 119/171 |
| 5,317,990 | 6/1994 | Hughes | 119/173 |
| 5,386,803 | 2/1995 | Hughes | 119/173 |
| 5,452,684 | 9/1995 | Elazier-Davis et al. | 119/173 |
| 5,503,111 | 4/1996 | Hughes | 119/173 |
| 5,577,463 | 11/1996 | Elazier-Davis et al. | 119/173 |

*Primary Examiner*—John G. Weiss
*Assistant Examiner*—Francis K. Cuddihy
*Attorney, Agent, or Firm*—Gary L. Wamer, Esq.

[57] ABSTRACT

The instant invention generally relates to absorbents formed from compacting bentonite-containing materials containing an effective amount of the bentonite particles of a size under 100 U.S. mesh. The absorbent is compacted under effective compacting pressures to form a bentonite material suitable for use as an absorbent and is characterized as having lower costs, increased absorbency over similarly sized and compositionally similar non-compacted bentonite-containing materials and/or improved clump strength when used as an absorbent.

92 Claims, No Drawings

COMPACTED BENTONITE-BASED ABSORBENTS

FIELD OF THE INVENTION

The invention relates to compacted, bentonite-based absorbents and their use as absorbents for liquid absorbing applications. These absorbents provide raw material cost savings and can exhibit improved absorbency and improved performance in a wide variety of uses. The instant compacted bentonite-based absorbents are particularly well suited for use as animal litters owing to the compacted bentonite absorbents ability to absorb animal urine in an amount substantially greater than non-compacted, bentonite-based absorbents and, further, owing to the remarkable ability of the urine-containing clump formed with the compacted bentonites to withstand high mechanical impact ("dry clump strength", as herein discussed).

BACKGROUND OF THE INVENTION AND PRIOR ART DISCLOSURE AND DISCUSSION

The compacted, bentonite-based absorbents of this invention may be used for a wide variety of liquid absorbing applications. The absorbents are particularly well suited for use as animal litters. A search of the prior art located the following patents relating to animal litters.

| U.S. Pat. No. | DATE OF PATENT | PATENTEE |
|---|---|---|
| 2,649,759 | 8/1953 | Gibbs |
| 3,286,691 | 11/1966 | McFadden |
| 3,765,371 | 10/1973 | Fisher |
| 4,009,684 | 3/1977 | Kliment et al. |
| 4,275,684 | 6/1981 | Kramer etr al. |
| 4,315,761 | 2/1982 | Larson et al. |
| 4,343,751 | 8/1982 | Kumar |
| 4,395,357 | 7/1983 | Kramer et al. |
| 4,409,925 | 10/1983 | Brundett et al. |
| 4,459,368 | 7/1984 | Jaffee et al. |
| 4,494,481 | 1/1985 | Rodriguez et al. |
| 4,494,482 | 1/1985 | Arnold |
| 4,506,628 | 3/1985 | Stockel |
| 4,532,890 | 8/1985 | Ohki et al. |
| 4,570,573 | 2/1986 | Lohman |
| 4,591,581 | 5/1986 | Crampton et al. |
| 4,638,763 | 1/1987 | Greenberg |
| 4,641,605 | 2/1987 | Gordon |
| 4,657,881 | 4/1987 | Crampton et al. |
| 4,671,168 | 6/1987 | Smith |
| 4,685,420 | 8/1987 | Stuart |
| 4,686,937 | 8/1987 | Rosenfeld |
| 4,844,010 | 7/1989 | Ducharme et al. |
| 5,000,115 | 3/1991 | Hughes |
| 5,062,383 | 11/1991 | Nelson |
| 5,129,365 | | Hughes |
| 5,317,990 | 6/1994 | Hughes |
| 5,452,684 | 9/1995 | Elazier-Davis et al. |
| Re. 33,983 | 7/1992 | Hughes |

| FOREIGN PATENT NO. | DATE OF PATENT | COUNTRY |
|---|---|---|
| 87001 | 8/1913 | EPO |
| 0087001 | 8/1983 | EPO |
| 0242478 | 10/1987 | EPO |
| 0378421 | 7/1990 | EPO |
| 0424001 | 4/1991 | EPO |
| 3620447A1 | 12/1987 | Fed. Rep. Germany |
| 58-009626 | 1/1983 | Japan |
| 0094043 | 5/1985 | Japan |
| 63-219323A | 3/1987 | Japan |
| 3044823 | 2/1988 | Japan |
| 3185323 | 7/1988 | Japan |
| 1191626 | 8/1989 | Japan |
| 58009626 | 7/1981 | Japan |
| 00094043 | 5/1985 | Japan |
| 1119127 | 6/1986 | Japan |
| 239932 | 10/1987 | Japan |
| 2239932 | 10/1987 | Japan |
| 1191626 | 1/1988 | Japan |
| 63-44822 | 2/1988 | Japan |
| 44823 | 2/1988 | Japan |
| 3044822 | 2/1988 | Japan |
| 3044823 | 2/1988 | Japan |
| 185323 | 7/1988 | Japan |
| 3185323 | 7/1988 | Japan |
| 3219323 | 9/1988 | Japan |

The Examiner's attention is specifically directed to the following patents relating to bentonite-containing animal litters (and to the additional prior art listed therein): U.S. Pat. Nos.: 4,591,581; 4,657,881; 5,000,115; 5,129,365; 5,317,990; 5,452,684; and Re. 33,983 (hereinafter the "Hughes Patents"). Further, the foreign patents listed above (and other prior) may be located in the last mentioned patent prosecution histories.

The prior art contains numerous patents on animal litters of various types. The use of clumping animal litters from natural clays has recently been developed and is now a well established product widely used by consumers. Although consumers have used a wide variety of clay and non-clay materials with various additives to provide animal litters, the primary growth market for animal litters is in the area known as "clumping litters". The most widely used and best known material used for clumping litters is shown and claimed in the Hughes Patents, including U.S. Pat. No. Re. 33,983, i.e., water-swellable bentonites. Bentonite clays have been routinely mined, dried, ground into a useable particle size distribution and sold (optionally with fragrance bactericide and other additives) for use in animal litter boxes, in particular, for use in feline litter boxes (a.k.a. cats). Although the use of water-swellable bentonite materials as animal litter is well established and has grown in the last several years to represent a significant percentage of all animal litter sold, the use of such water-swellable bentonite materials has undergone little change or improvement over the last several years. Manufacturers have provided variations in fragrance, appearance, particle size and various other selected additives in an attempt to provide product differentiation to consumers in their bentonite-based litter products, but no significant changes in animal litter have been observed. Although consumers recognize these marketing differences as between animal litters, there have been no significant improvements in the processing of bentonite clays for use in animal litters so as to substantially improve the performance and use of bentonite-containing animal litters.

The manufacturing process as for bentonite-based litters generally involves a drying, grinding and sizing process for mined, field dried bentonite pursuant to which a ground bentonite product is put into containers and then sold to consumers. Several patents have claimed the use of bentonite-containing clays for use as animal litters. The several patents issued to John Hughes (U.S. Pat. Nos.: 5,000,115, 5,129,365, 5,317,990 5,452,684; and Re. 33,983 of U.S. Pat. No. 5,000,115): the "Hughes Patents") disclose the use of a "non-compacted" water-swellable bentonite clay for use as an animal dross absorbent. The patentee discusses at great length the need to use a "non-compacted" bentonite and bases this discussion on the disclosure of U.S. Pat. No. 4,657,881 and the testing of samples prepared based upon the disclosure of U.S. Pat. No. 4,657,881. The patentee states that compacted clays are very adherent to animal's paws and fur after wetting. (The patentee relies on this statement as a basis for distinguishing the disclosure of U.S. Pat. No. 4,657,881 which does not relate to compacted bentonite but actually discloses the compaction of non-swelling clays.) At column 11, lines 28 to 47 of U.S. Pat. No. 5,317,990, the patentee demonstrates that a compacted mixture of sodium bentonite and calcium bentonite provided a granular litter that was slow to absorb a NaCl solution, had puddling, formed thin, pancake shaped clay masses and was very sticky. The patentee states at column 10, lines 65 et seq. that the compacted bentonite clay was compacted by compression in a tablet machine (as disclosed in U.S. Pat. No. 4,657,881 (Crampton, et al.), and then ground and sized to remove all particles below 710 microns and greater than 4 mm. The tablet machine in Crampton applied a pressure of 5 KN/sq cm (approximately 2860 pounds per lineal inch gauge). Accordingly, U.S. Pat. No. 5,317,990 teaches that compacted sodium and calcium bentonite are unsuitable for animal litters. Apparently, the patentee used a wide particle size distribution of the bentonite mixture that was compacted for testing. The patentee of U.S. Pat. No. 5,317,990 is also the patentee of Re. 33,983 which discloses and claims the use of a water-swellable bentonite clay having a particle size from about 50 microns to about 3350 microns and having a sufficient amount of fine particles so that upon wetting, a substantial quantity of the clay will agglomerate. The patentee discloses the water-swellable bentonite to have this distribution of large particles as a result of grinding and sizing naturally occurring, mined bentonite. The patentee does not discuss compacted water-swellable bentonite clays or the use of bentonite fines to form an animal litter.

The prior art further discloses (U.S. Pat. No. 4,657,881) that a water-swellable bentonite compacted at a pressure of 5 KN/cm$^2$ (2860 lbs/lineal inch) is unsuitable for use as a clumping animal litter. Further, U.S. Pat. No. 4,657,881 discloses that formation of compacted clays for use as a litter should not include more than 10 percent by weight of any naturally or synthetic swelling clay additive (see: column 3, lines 46 to 57 whereat the patentee states the amount of "additive" which can be used. Bentonite is identified in column 2, lines 66 to 68 as an "additive"). What is clear from the above discussion of the prior art on the use of bentonite-containing material is the teaching that compacted water-swellable bentonite clays are not suitable for animal litters. The instant invention demonstrates that the prior art teachings failed to appreciate the benefits of compacted water-swellable bentonite as an animal litter owing to use of low compacting pressures, incorrect assumptions (without testing) on the nature of compacted water-swellable bentonite and failure to appreciate the use of feline urine in evaluating the use of compacted water-swellable bentonite as a feline animal litter.

U.S. Pat. No. 5,452,684 (Sep. 26, 1995) discloses a process for extruding smectite clay (bentonite-containing clays) wherein the smectite clay is shear extruded with large amounts of water and/or an adhesive binder. The patentees disclose that by use of an extrusion process that them is an increase in the overall clump strength as a result of a shearing process which occurs during extrusion through a die opening. The patentees state that the shear extrusion process provides an alignment of the clay platelets as a result of the extrusion process which substantially increases the strength of the final clumps. The improvement in the clumping strength is not stated to result in any change of the absorbency of the material. The patentees state at column 8, lines 22 to 30 that:

> "Generally the moisture of the clay should be in the range of about 20% to about 45% based on the dry weight of the smectite clay when the clay is extruded. The extrusion is more efficacious when done on rehydrated smectite clays rather than crude undried clay. If the clay is too dry it would be forced through the die openings in a powdery form without sufficient platelet alignment, and, therefore insufficient improvement in clump strength."

In addition, the patentees state that it is preferred to provide, in addition to an extremely high water content bentonite, an adhesive in an amount from about 0.025% to less than about 0.1% by weight. The preferred adhesive is carboxymethyl cellulose. As noted above, the water content is preferably between about 20% and about 45% and preferably an adhesive is employed to provide the animal litter. Further, the patentees discuss at column 9, lines 25 et seq., that it is preferred to use a bentonite-containing material which has a typical and preferred particle size in the range of about 10 microns to about 200 microns and preferably less than about 100 microns. The examples of U.S. Pat. No. 5,452,684 do not disclose or allege to have changed the overall absorbency of the bentonite-containing animal litter.

The instant invention employs bentonite fines to produce an improved animal litter. The litter has both improved absorbency for feline urine and improved dry clump strength. Bentonite fines have previously been used as components of drilling muds, cosmetics and for iron ore pelletizing ("IOP"). Fines (very small particles) also often result from the manufacturing of animal litter using bentonite and have generally been discarded as landfill materials or reused by addition of large amounts of water, processed by pin-mixing and then redried, sized and reprocessed. This discarding or pin-mixing of the bentonite fines is costly and can result in a significant percentage of the bentonite from not being used as final product. This increases the cost of the animal litter to consumers. As aforementioned, manufacturers have sought to recover these fines through a process called "pin mixing" pursuant to which large amounts of water are added to the fines and the material is pin mixed under low pressures and then dried, ground and sized. This addition of large amounts of water up to 30% by weight (based on the total weight of the bentonite) is expensive in view of the significant additional energy cost of water removal.

The instant invention relates to absorbents containing compacted bentonite-containing particles which show improved absorbency and dry clump strength when used as absorbents.

SUMMARY OF THE INVENTION

The instant invention is directed to improved bentonite-containing compositions for use as a liquid absorbent, and is particularly well suited for use as animal litter, particularly feline animal litters.

The instant invention generally relates to bentonite-containing absorbents formed by compacting bentonite particles having an effective amount of bentonite fines, preferably at least about 30 weight percent of the particles, of a size under 100 U.S. mesh, preferably under 200 U.S. mesh, under effective compacting pressures to form a bentonite material suitable for use as an absorbent (e.g., an animal litter) and characterized as having increased absorbency over similarly sized and compositionally similar bentonite-containing materials formed from non-compacted bentonite clays. This improved absorbency may be achieved without the need for adhesive binders, although such may be optionally included. The primary absorbent use discussed herein is as an animal litter, although other well known absorbent uses, are within the scope of this invention.

The improved absorbency for liquids of the instant absorbents is surprising. In general the increased absorbency of the absorbents made by use of compacted bentonite-containing material when used to absorb feline urine is typically at least 10 wt %, generally at least 20 wt % and often by as much as 100 wt % based upon the weight of litter required to absorb a volume of urine. Further, the animal litters of this invention have been observed to have significantly improved dry clump strength, as hereinafter discussed.

In one embodiment the compacted bentonite-containing absorbent of this invention is formed from bentonite particles having a water content of between about 5% and about 15% by weight, preferably between about 5 and about 10% by weight, having at least 30 weight percent of the particles passing through a 100 U.S. mesh screen, preferably a 200 U.S. mesh screen, compacted under effective compacting pressures of at least about 1000 pounds per square inch (gauge). The compacted bentonite-containing material is then ground ("comminuted") and sized to appropriate size for use as an animal litter or other absorbent use.

The instant invention is to be distinguished from the prior art and previous bentonite-containing absorbing materials in that the instant absorbents are formed by compacting under effective compacting pressures (typically at least 1000 pounds per square inch (gauge) ("psig")) particles of a water-swellable bentonite having an effective amount of bentonite fines, preferably at least about 30% by weight of the particles) of a size less than about 100 U.S. mesh, more preferably a 200 U.S. mesh screen. Use of compacted bentonite-containing materials bentonite "fines" to form a compacted absorbent have heretofore been deemed generally unsuitable for use as an animal litter or other absorbent uses.

DESCRIPTION OF THE INVENTION

The instant invention is directed to improved bentonite-containing absorbent compositions for use as a liquid absorbent, and are particularly well suited for use as animal litters, particularly feline animal litters.

As used herein the following terms shall have the following meaning:

1. "Compacted" means the use of an effective compacting pressure applied to particles of a smaller selected size to form larger particles or other mass from the selected size particles.
2. "Fines" means particles having a size less than 100 U.S. mesh.
3. "Classified fines" means particles having a size less than 200 U.S. mesh.
4. "Dry clump strength" means the load applied to the surface of a mass which causes the mass to fracture after use as a liquid absorbent and after air drying.
5. "Wt. %" or "% Wt" means weight percent.
6. "Bentonite fines" means "fines" comprising a bentonite-containing material.
7. "Bentonite classified particles" means particles of a bentonite-containing material having at least 30 wt % as fines.
8. "Compacted bentonite" means a bentonite-containing material containing an effective amount of bentonite fines compacted under effective compacting pressures.

The instant invention generally relates to bentonite-containing absorbents formed by compacting bentonite particles having an effective amount of bentonite fines, preferably at least 30 weight percent of the particles, of a size under 100 U.S. mesh, preferably under 200 U.S. mesh, under effective compacting pressures to form a bentonite-containing absorbent material. Use of an effective absorbent amount of the compacted bentonite provides one or more of the benefits of the instant animal litter, as hereinafter discussed.

The instant absorbents are suitable for use as absorbents, including use as an animal litter, and are characterized as having increased absorbency over similarly sized and compositionally similar bentonite-containing particulate materials formed from non-compacted bentonite clays. Such improvements can be achieved without the need for adhesive binders as taught in the prior art, although such may be optionally included.

The improved absorbency for liquids is particularly surprising and further, has been observed to have a unique absorption pattern to feline urine as contrasted with water or synthetic feline urines (such as NaCl solutions) which have been employed heretofore for testing animal litters (see: U.S. Pat. No. 5,452,684). Further, when the instant absorbents are employed as animal litter, the animal litter has improved dry clump strength for improved use as a clumping animal litter. In general the increased absorbency is typically at least 10% by weight, generally at least 20% by weight and often as much as 100% by weight, based on the weight of litter required to absorb a test liquid, (e.g., a volume of cat urine).

In one embodiment the compacted bentonite-containing animal litter of this invention is formed from bentonite particles having a water content of between about 5% and about 15% by weight, preferably between about 5 and about 10 wt %, having an effect weight percent of bentonite fines (preferred at least 30 weight percent of the particles passing through a 200 U.S. mesh screen (less than about 74 microns)) and are roll compacted under an effective pressure of at least 1000 pounds per square inch (gauge). The compacted bentonite-containing material is then comminuted and sized to appropriate size for use as an animal litter.

The instant invention is to be distinguished from previous bentonite-containing absorbing materials in that absorbents are formed by compacting under effective compacting pressures, preferably at least 1000 pounds per square inch (gauge), particles of a water-swellable bentonite-containing material containing an effective amount of bentonite "fines", preferably having at least 30 wt % of particles of a size less than about 100 U.S. mesh. Such bentonite "fines" have heretofore been generally deemed unsuitable for use as an animal litters. The instant compacted water-swellable bentonite-containing compositions are preferably formed by compaction from bentonite materials containing small particles, commonly referred to as "fines" or (sold as IOP grade or taconite) which are compacted at effective compaction pressures, preferably at least 1000 pounds per square inch (gauge), to form a compacted mass which is then ground and screened to provide a size suitable for use as an adsorbent, e.g., as an animal litter.

It is evident that the prior art does not disclose or teach the significant benefits to be obtained from compacting bentonites containing water-swellable bentonite fines to form absorbents, including animal litters. Among these benefits are:

1. Improved absorbency as demonstrated by a higher amount of liquid being absorbed per weight of absorbent;
2. Higher "dry clump strength";
3. Lower raw material costs as a result of using historically lower priced IOP bentonites;

4. Recycle of bentonite "fines" generated during processing of natural bentonite;
5. Ability to use a wider variety of and higher amounts of additives during the compacting of the bentonite fines owing to the improved dry clump strength and higher liquid absorbency;
6. Ability to use other additives by dry blending with compacted bentonite-containing absorbent and maintain suitable dry clump strength for use as a clumping animal litter;
7. Use of less animal litter by users when the absorbent is used as a litter; and
8. Lower shipping costs owing to lower use amounts by users.

The instant compacted water-swellable bentonite-containing animal litters can provide the above benefits when used as a 100 wt. % bentonite animal litter or when such are blended with other components during the compacting process and/or blended with other components after the compacted bentonite is formed to form a physical mixture. The term "blended" is used here to cover the various methods by which the materials may be blended. For example, the particles containing bentonite fines can be blended with an additive, such as a granular zeolite or a granular non-clumping clay such as attapulgite, prior to being compacted. The blended mixture can then be compacted according to this invention. The improved clump strength exhibited by bentonite-containing materials containing bentonite fines can compensate for any deleterious clumping effect which arises from use of a non-clumping additive. Alternatively, particles of such compacted bentonite can be blended with other additives, including other absorbents. Although the upper amount of additive which may be added (during compacting or as a physical blend with compacted bentonite particles) while still maintaining adequate clump strength is not known, it has been observed that addition of 20 weight percent natural zeolite provides a physical mixture of the zeolite and compacted bentonite that provides an animal litter with a clump strength greater than that obtained using only a non-compacted natural bentonite litter. Further, the compacted bentonite of this invention also provides significantly higher liquid absorbency. Animal litters of this invention can be formed by blending compacted water-swellable bentonite with non-compacted water-swellable bentonite or other additives and/or other known animal litter materials. It has been observed that blending 5 wt % (based on the final total weight of the animal litter) of compacted bentonite fines with 95 wt % of a non-compacted bentonite-based animal litter, having similar particle size ranges, provided a final animal litter with substantially similar use characteristics (when used as a feline litter) as a non-compacted bentonite obtained from mining a natural bentonite after drying, grinding, and sizing the natural bentonite to a selected particle range. This provides raw material cost reduction without performance loss. Adding 20 weight percent compacted bentonite to a non-compacted bentonite litter gave significant improvements in liquid absorbency and dry clump strength. Another surprising characteristic of the instant animal litter is the different particle shapes observed, as compared to naturally mined bentonite-containing animal litters of similar mesh size. The importance of different geometric shapes of the particles formed from the compacted bentonite particles is not yet fully understood, though it is clear that more laminar particle shapes allow for closer bulk particle-to-particle packing which has some advantages with respect to increasing bulk density and decreasing litter bed porosity which may be desirable under certain circumstances. This laminar geometry may at least in part be related to the laminar form of the compacted bentonite materials which may upon grinding break along the interfaces of the laminar structures formed during the compaction process. Parameters which can be controlled in the roll compaction process can influence particle shape. Some of these parameters include compaction pressure, roll surface, roll gap, and nature of feed.

Animal litters formed using compacted bentonite fines are advantageous in that the cost of raw materials has been significantly reduced, the cost of controlling and/or disposing of fines reduced, litter performance improved and such has been accomplished without having negative effects on the performance of the final animal litter.

The absorbent compositions of the instant invention are formed from water-swellable bentonite materials having bentonite fines. The bentonite material is preferably a clay containing more sodium bentonite than calcium bentonite owing to the higher water-swellability of sodium bentonite over calcium bentonite. The use of bentonite clays in a variety of commercial applications, such as a component in drilling muds, is well known. Bentonite clays are naturally occurring and commercially available with varying ability to become hydrated and swell in the presence of water and/or water-containing liquids. The hydrating and swelling properties of bentonite clays are at least in part related to the exchangeable cations present in a given bentonite clay as mined or as ion exchanged after being mined. Water-swellable bentonite clays naturally contain cations, including sodium, potassium, lithium, calcium and magnesium as mined with the relative amount of each cation varying with different geological deposits and areas where the bentonite is mined. Although any one or all of these cations can be the cation found in a given bentonite clay, naturally occurring bentonite clays having more sodium than calcium cations are preferred owing to their higher water absorbency and ability to form clumps upon wetting. The general use and description of bentonite clays as used for animal litters is disclosed in U.S. Pat. Nos.: 5,000,115; 5,129,365; 5,317,990; Re. 33,983; and 5,452,684; said patents incorporated herein by reference thereto. Such patents generally disclose the particle sizes for bentonite-containing clumping litters suitable for use as animal litters as between about 50 μ (microns) and about 3350 μ, with 600 μ to about 3350 μ being preferred.

The compacted water-swellable bentonite-containing materials which are useful in forming the animal litter compositions of the present invention are formed from an effective amount of "fines" of a water-swellable bentonite, preferably sodium bentonite, that hydrates in the presence of water, e.g., swell in the presence of water and/or liquid animal waste. As mentioned above, the water-swellable bentonite clay to be compacted can be selected from the group consisting of sodium bentonite, potassium bentonite, lithium bentonite, calcium bentonite and magnesium bentonite; or combinations thereof. Further, bentonites which have been ion-exchanged with cations, such as ammonium or other quaternary ammonium cations or functionally similar cations can be used if the bentonite is still water-swellable. Well known bentonite clays include the smectite clay group, most often containing over 50 wt % of a montmorillonite.

Commercially available bentonites which can be used herein as the water-swellable bentonite-containing material to be compacted may be obtained from several suppliers. Suitably sized sodium bentonite is available as an IOP (Iron Ore Pelletizing) grade bentonite. One such IOP grade bentonite is generally available from WYO-BEN, INC. and is characterized by the manufacturer as a natural sodium bentonite having the following chemical and physical characteristics:

TABLE A

| Color<br>Chemical Analysis | Light Gray<br>Wt. Percent |
|---|---|
| $SiO_2$ | 61.4 |
| $Al_2O_3$ | 18.1 |
| $Fe_2O_3$ | 3.5 |
| $Na_2O$ | 2.3 |
| MgO | 1.7 |
| CaO | 0.4 |
| $TiO_2$ | 0.2 |
| $K_2O$ | 0.1 |
| Other | 0.07 |
| $H_2O$ | 7.8 |
| L.O.I. | 4.4 |
| Other Properties | |
| Ph (5% suspension) | 9.1 |
| Cation Exchange Capacity megs/100 grams | 80 |
| Surface Area ($m^2$/gram) | |
| External Surface: | 82 |
| All Surfaces: | 700–800 |
| Bulk Density | 60 lb/ft$^3$ |
| Plate Water Absorption (ASTM E946-83) | 700–800 |
| Grind (Wt % Passing 200 Mesh) | 80% ± 3.5% |
| Moisture Content (wt %) | 7% ± 1.5% |
| Montinorillonite Content (wt %) | 70% |

Other sources of bentonite-containing materials containing bentonite fines are commercially available and are sold as IOP grade bentonite or as taconite for use as pelletizing taconite ore concentrates. The instant invention is economically advantageous in its use of bentonite fines owing to their substantially lower cost. Use of natural bentonite of suitable size for use as an animal litter after being manufactured by drying, grinding and sizing naturally mined bentonite is claimed in U.S. Pat. No. 5,000,111, 5,129,365, 5,313,990 and Re. 33,983, incorporated herein be reference thereto. Use of compacted bentonite fines according to the instant invention provides for a substantial reduction in raw material costs over use of naturally mined bentonites as disclosed in the last mentioned patents. Further, bentonite fines are formed during the manufacture of animal litter from a bentonite-containing material (from either compacted or non-compacted bentonite particles). The generation of such bentonite fines is a result of attrition of bentonite-containing particles resulting from mechanical handling of bentonite-containing materials as the bentonite goes through a manufacturing process during which it is physically conveyed, mixed and blended and put in containers. During such manufacturing processes "fines" are formed. Vacuum or other air directing equipment results in collection of these fines and provides a recycle source of bentonite-containing fines for use in forming compacted water-swellable bentonite-containing animal litters according to the instant invention.

The benefits of the instant invention can be formed using water-swellable bentonites even after the bentonite has been field dried and/or calcined to lower the weight percent water below 20 percent by weight. In fact, it is beneficial to have lower water content in forming the instant absorbents. The use of bentonite clays having such lower water content is unexpected in view of the prior art (such as U.S. Pat. No. 5,542,684). Unlike the disclosure in the prior art, drying of bentonite fines prior to compaction does not detrimentally decrease the water absorbency of the final compacted water-swellable bentonite, as compared to a similarly sized non-compacted water-swellable bentonite, provided at least about 5 wt % water is present. Consequently, dried compacted bentonite clays having an effective amount of bentonite fines are not only still able to absorb many times their weight of a liquid and agglomerate with nearby wetted bentonite particles to form wet clumps of bentonite as effectively as undried bentonite particles, but also significantly improved absorbency for feline urine and improved dry clump strength when used as an animal litter. The effective amount of water associated with the bentonite-containing material has not been fully explored. An amount of moisture is believed to be necessary to form the compacted masses. Since there is believed to be a correlation between the effective Wt. % water and the effective compaction pressure, lower total Wt. % water may in some instances be employed if correlated to the compaction pressure and/or other process parameters. Weight percents water between 6.4 and 8.1 have been shown to provide beneficial results over a wide range of compaction pressures as shown in the instant examples.

In one embodiment the instant invention relates to an absorbent containing a compacted water-swellable bentonite-containing material formed by compacting under effective compacting conditions water-swellable bentonite particles having at least 30 weight percent of its particles, preferably at least 70 wt % of a size less than 100 U.S. mesh, more preferably less than 200 U.S. mesh. The absorbent containing the compacted bentonite materials may be used for a wide range of absorbent uses but are particularly well suited for use as animal litters. The bentonite material after compacting is submitted to grinding and sizing to provide suitably sized particles for use as an animal litter as shown in the prior art and examples herein. Animal litter products are typically characterized as having particles between various U.S. mesh sizes, such being used to screen the particles into fractions which are retained by the mesh size. Animal litters are typically sold as 12/40, 16/40, 8/25, 8/30 or 12/30 U.S. Mesh products, for example, based on standard U.S. mesh, ASTM Series E.11.

It has been found that the instant compacted water-swellable bentonite materials when formed in appropriate sizes are useful in a feline litter box and as a feline litter so as to cohesively agglomerate when wetted by feline urine or when in contact with moist fecal matter (such having surface moisture or liquid) to permit physical separation of the wetted, agglomerated bentonite masses from the litter box. It has also been observed that litter particles appreciably smaller than about 210 microns (70 mesh) are typically too small to be useful as animal litters for several practical reasons. First, as litter particle size becomes smaller a tendency exists for the litter to be increasingly tracked by the animal as the litter clings to its fur and is typically not heavy enough to fall off. Also, finer sized clay particles pack more tightly during use and do not offer sufficient void space between litter particles to permit animal urine to penetrate sufficiently deep into the bed of litter to form the clump. Further, litter particles appreciably smaller than about 210 microns (70 mesh) when used in animal litter tend to form thinner, flater clumps which because of their shape tend to flex and break when mechanically agitated by a cat and/or when being scooped from the litter box.

The instant invention results in the production of a compacted water-swellable bentonite of larger particle size than the bentonite fines from which they were in at least part formed whereby the larger particles are useful as a litter which upon wetting with animal urine or moisture on solid animal feces forms sufficiently large wetted, agglomerated masses with excellent wet and dry physical cohesive strength for removal from the bed of bentonite litter from which it was formed by absorbing a liquid or adherence to the moist surface of solid feces.

The compaction of water-swellable bentonite particles containing bentonite fines may be accomplished by a wide variety of compaction processes known in the art to effect size enlargement of small particles into larger particles. These larger particles are often referred to in the art as agglomerates, and the process of making the larger particles is often referred to as agglomeration. A particularly enlightening treatise on size enlargement by agglomeration is published by John Wiley & Sons, entitled "Size Enlargement by Agglomeration" by, Wolfgang Pietsch, (1991). A wide variety of presses may be used to provide the compacting pressures of this invention so as to form compacted water-swellable bentonite containing an effective amount of bentonite fines. One particularly useful process is the use of a press with rolls. This compaction process is generally referred to as "roll compaction" or "roll pressing", since the material to be compacted is pressed between rollers rotating in opposite directions while applying pressure to continually advancing material. The aforementioned treatise discusses the process of roll compaction at pages 260 to 332, incorporated herein by reference thereto. In one embodiment, compaction is carried out by roll compaction by passing the water-swellable bentonite-containing material through opposing rollers urged together under a selected total pressure of at least 1000 pounds per square inch (gauge), preferably at least 1500 pounds per square inch (gauge) and, further, at a pressure of at least 3500 psig. Roll compaction pressures are often stated in terms of pounds per lineal inch (pli), and pressures of at least 5000 pli are believed suitable, with roll compaction pressures of at least 10,000 pli and more preferably at least 20,000 pli being useful herein. Roll compaction pressures of 28,000 pli have been found usable herein to form the compacted masses which contain effective amounts of bentonite fines. The surfaces of the rolls may be selected from a wide variety of surface textures and designs. The roll surfaces may be smooth or profiled so as to produce a continuous compacted bentonite, having a planar smooth shape, rod-shaped, briquette-shaped, corrugated shape, fluted shape or other selected shapes. After the water-swelled bentonite particles are compacted, the compacted bentonite mass is broken up by passing it through one or more grinding means selected to form a preselected particle size distribution, depending on selected absorbent use, from the compacted bentonite mass. The broken up bentonite mass from the grinding means is then passed through suitable sizing screens to give a final product having a preselected particle size range and/or particle size distribution. Compacted bentonite-containing particles which are too small or too large for the intended use can be recycled for compacting. Alternatively, particles too large for the intended use (e.g., animal litter) can be recycled by regrinding such bentonite particles and recycling the reground particles. Since the instant invention relates in its broadest sense to the compaction of water-swellable bentonite-containing particles containing bentonite fines the actual compaction means used for compacting the bentonite fines is more one of efficiency for commercial manufacturing as contrasted with being critical for obtaining the benefits observed. Among the numerous compacting processes and techniques known in the prior art which may be employed herein, include, but not limited to, roll compaction, roll briquetting, vertical hydraulic pressing, rotary tableting, gear pelleting and flat plate pelleting.

In general, it has been observed that when compacting materials containing water-swellable bentonite fines for use as an animal litter that an effective compacting pressure should be preferably employed to form a compacted bentonite mass having resistance to suitable attrition arising from handling and shipping while also providing the improved absorbency and dry clump strength characteristic of this invention. Compacted bentonite masses when compacted at sufficient compacting pressures according to this invention have been observed to exhibit an attrition comparable to non-compacted bentonite litters in resistance to attrition during shipping and handling and during use as the final animal litter product. It has been observed that a roll compaction pressure of 11,250 pounds per lineal inch produces compacted bentonite particles in accordance with the instant invention having suitable resistance to attrition for use as an animal litter.

The compacted litter composition of the present invention can be formed from use of only the compacted water-swellable bentonite or can, optionally, include additives, such as perfumes, deodorants, odor absorbents, antimicrobial agents, disinfectants, colorants, pesticides, portland cement, Ph-control agents, desiccants, perborates and other chemical oxidants and the like in an effective amount(s) sufficient to perform their intended function as well known in the art relating to animal litters. The animal litter can also be mixed during compaction or after compaction with other typically used animal litter composition such as other clays, sand, or cellulose-based materials and other non-compacted bentonite litters. The amount of such optional ingredients should not adversely affect the ability of the compacted water-swellable bentonite to absorb liquid (e.g., animal urine) so as to permit the particles to agglomerate into agglomerated masses ("clumps") of sufficient size and clump strength for physical removal of the clumps from the remaining litter material in the litter box. Optional ingredients and additives to be used during the compaction process or blended with compacted bentonite fines may be added in an effective amount between about 0.05% by weight of the total weight of the animal litter and about 20% by weight of the litter composition, although lower or higher additive amounts may be employed for cost reduction or to provide other functional benefits.

It should be noted that the animal litter of the present invention can be used in litter boxes or in cages of a wide variety of animals including common pets, cats, dogs, gerbils, guinea pigs, mice and hamsters, rabbits, ferrets and laboratory animals (e.g., mice, rats, and the like). The animal litter of the present invention is especially useful for smaller household animals, such as cats. Surprisingly, the compacted water-swellable bentonite litter of the present invention has been found to have unexpected (as compared to non-compacted bentonite) benefits when used to absorb feline urine, although such is nonetheless useful for absorbing other waste liquids such as blood, vomit and other fluids excreted by animals.

The instant compacted bentonite-containing materials can be used as a "clumping animal litter" to selectively remove liquid animal wastes from a weight of animal litter by: contacting the animal litter with liquid animal waste thereby producing an agglomerated mass (generally referred to as a "clump") comprising the animal litter and the liquid animal waste that is of sufficient size and of sufficient clumping strength to be removed from the litter and a remaining amount of litter; and removing the clump from the remaining amount of litter. Although the clump can be removed as a wet clump, owing to the use patterns of cat owners the clump is generally removed after it has dried at room temperature for a period of about 24 hours, thereby effectively removing the liquid animal waste from the remaining amount of litter. Owing to the moisture on the surface of solid animal wastes, the instant litters are also effective in adhering to solid animal wastes. In addition, the animal litter can be used with litter boxes of known designs. Such litter boxes are water-impermeable receptacles having disposed therein a litter comprising a compacted bentonite according to this invention and capable of agglomerating upon wetting into a clump of sufficient size and of sufficient clump strength for physical removal of the clump from the litter box. The removal of the clump is without substantial adherence to an animal, when either a wet clump or dry clump form.

The natural tendency of bentonite and other inorganic clays is to form dust upon handling as a result of attrition of the particles during handling and shipping. It has been found that use of colloidal polytetrafluoroethylene as disclosed in U.S. Pat. Nos. 3,838,092; 3,838,064; 3,993,584 and 3,974,089, incorporated herein by reference thereto, can be beneficially employed herein to decrease the amount of dust formed from attrition of bentonite-containing absorbents.

TESTING PROCEDURES

DRY CLUMP STRENGTH TEST

"Dry Clump Strength" was determined by measuring the peak load required to drive a probe through a dried litter clump. The litter clump was made by depositing 10 milliliters (mils) of 100° F. fresh cat urine on a prepared bed of the sample litter and allowing it to dry for at least 48 hours. The dried litter clump, having a flat side on the upper most surface, is inverted so that the flat side is down when placed on a testing platform. A 3.5 inch in length, ¼ inch diameter brass rod with a ¼ inch chisel point is fixed on a load cell. The probe load cell assembly moves into the dry litter clump at its thickest point, typically at the center of the dry clump, at a rate of 5 inch/minute. Peak load is measured in pounds. Multiple samples of dry litter clumps were measured and the average value reported.

ABSORBENCY TEST

Absorbency was determined by determining the weight of animal litter used to absorb a specified volume of cat urine. A litter clump sample was made by depositing a specified volume of 100° F. fresh cat urine on a prepared bed of animal litter and then covering the wet litter with unused dry litter. After two to five minutes, the wet litter clump is weighed. The weight of the specified volume of cat urine is subtracted from the overall wet clump weight to obtain the weight of litter used to absorb the specified weight of cat urine. Absorbency is expressed as the weight of litter used to absorb a specified volume of urine and has units of grams. Multiple specimens were measured and the average value reported.

MOISTURE CONTENT TEST

"Moisture Content" was determined on a weighing scale with an infrared heating oven that heats the litter sample and measures weight loss. The loss in weight is recorded as the amount of free moisture in the litter sample. The sample size is selected as 5 grams. The heating is controlled to deliver an oven temperature of 135° C. Moisture content is reported as a weight percent loss after ten (10) minutes, based on initial sample weight. Duplicate samples are averaged when measured and the average reported.

PARTICLE SIZE TEST

"Particle Size Determination" is performed on a RoTap® brand sieve shaker. Samples weighing 200 grams are sieved through specified US Standard Mesh screens or other specified screen sizes for 5 minutes. Amounts of sample retained on the specified screen are weighed and reported as "weight percent retained".

BULK DENSITY TEST

"Bulk Density Determination" was conducted by weighing the amount of litter required to completely fill a 1.25 quart container. Bulk density is reported in units of pounds per cubic foot (lbs/cu ft).

EXAMPLES

Example 1

A bentonite-containing material containing bentonite fines (59.1 wt % less than 100 U.S. mesh and 34.6 wt % less than 200 U.S. mesh) were obtained from a commercial manufacturing process of a bentonite-based animal litter. The clumping animal litter formed from the natural bentonite was used as a control for comparison to the compacted bentonite of the invention. The chemical composition of this bentonite-containing material was analyzed and found to be a sodium bentonite with minor amounts of zeolite and calcium montmorillonite. Moisture, bulk density, and particle size distribution of these sodium bentonite-containing fines are reported in Table 1, the attached table. The fines were fed to a FitzPatrick Model L83 Chilsonator roll compacting equipment to form roll compacted sticks. The roll compactor employed a full axial surface pattern on 2.78 inch diameter rolls which rotated at about 10.7 rpm (revolutions per minute) with an opening of 0.020 inches at the nip. A hydraulic pressure of 1300 psig (pounds per square inch gauge), equivalent to a hydraulic force of 11,250 pli (pounds per lineal inch), was applied to form the compacted sticks at a rate of 280 pounds/hour. The compacted bentonite mass exhibited an average density of about 1.84 g/cc (grams per cubic centimeter).

The compacted bentonite mass was fed to a FitzPatrick Model DASO6 Comminutor to reduce the size of the compacted mass to a granulated product of particle size range targeted at −12/+40 US Standard Mesh (all mesh sizes reported in the examples will be U.S. Standard Mesh, ASTM Series E.11, unless otherwise stated). The comminutor employed a sharpened blade rotating at 1500 rpm inside a perforated screen cage with 0.187 inch openings. Approximately 80 wt % of the discharged comminuted product had a particle size larger than that which would pass through a 40 mesh screen. The final product was generated by screening the discharged comminuted product using a RoTap® Sieve Shaker with 12 U.S. mesh and 40 U.S. mesh screens. Moisture, bulk density, and particle size distribution of the final product are reported in Table 1.

The results in Table 1 show that the compacted/granulated product made from bentonite-containing fines had better clump strength than the naturally mined (mined, dried, granulated, and size classified) bentonite litter from which it was derived.

TABLE 1

| Particle Size Dist. (wt % retained on screen) | Bentonite-based litter (control) | Bentonite-Containing Bentonite Fines | Roll Compacted, Comminuted, Size Classified |
|---|---|---|---|
| +12 mesh (+1680 micron) | 0.5 | not tested | 0.0 |
| +20 mesh(+840 micron) | 42.7 | not tested | 57.4 |
| +40 mesh(+420 micron) | 45.3 | 25.2 | 42.6 |
| +60 mesh(+250 micron) | not tested | 7.9 | 0.0 |
| +100 mesh(+149 micron) | 10.5 | 7.8 | 0.0 |
| +200 mesh(+74 micron) | 1.0 | 24.5 | 0.0 |
| +325 mesh(+44 micron) | 0.0 | 24.9 | 0.0 |
| −325 mesh(−44 micron) | 0.0 | 9.7 | 0.0 |
| Wt % Moisture | 8.1 | 7.5 | 7.5 |
| Bulk Density (lb/cu ft) | 61.6 | 28.7(loose) 71.8 (tapped) | 62.4 |
| Dry Clump (lbs) | 4.1 | not applicable | 8.4 |

Example 2

The bentonite-containing material containing bentonite fines of Example 1 was fed to the receiving hopper of a FitzPatrick 4Lx10D Chilsonator System. This roll compaction/granulation system is a continuous operation system involving controlled feed rate, compaction, comminution, size classification, dust collection, and recycle of oversized and undersized materials. The bentonite-containing material was de-aerated and pre-densified (generally a pressure of up to about 100 psig) as the particles were conveyed into the nip of the compaction rolls. The compaction rolls were 4 inch in length and 10 inches in diameter and employed a sine circumferential surface pattern. The rolls were operated at 14 rpm (rotations per minute) and delivered a hydraulic pressure of 1900 psig (hydraulic force of 18,650 pli) to form a compacted bentonite-containing sheet at a rate of 1128 pounds/hour. The average density of the compacted sheet was 2.03 grams per cubic centimeter (g/cc).

The compacted sheet was then gravity fed to a FitzPatrick Model DKAS012 Comminutor located just below the roll compactor. The DKASO12 employed a sharpened blade rotating at 1750 rpm inside a perforated screen cage with 0.156 inch openings. All comminuted material was gravity fed onto a 48 inch double deck circular vibratory screener equipped with a coarse screen size of 10 mesh MG (Market Grade) and a fine screen size of 36 mesh TBC (Tensile Bolting Cloth). These screen mesh sizes were selected to produce a nominal −12/+40 mesh product. Both the "overs" (retained on 10 mesh MG) and the "Unders" (passing through 36 mesh TBC) were vertically conveyed via a bucket elevator as recycle and combined with incoming feed located at the upper most portion of the system at a ratio weight of approximately 0.79 recycle:feed. The granular material retained between the two screens, was collected as final product as it discharged from the screener chute.

The data in Table 2 show that the compacted/granulated product made from the bentonite-containing material having bentonite fines had a lower bulk density than a naturally mined bentonite (mined, dried, granulated, and size classified) control. The lower bulk density and higher absorbency results in a lower total weight of absorbent use for a given volume of absorbed liquid. Further, a physical blend of 75 wt % of the control and 25 wt % of the compacted bentonite material had a higher dry clump strength than 100 wt % of the control.

TABLE 2

| Particle Size Dist. (wt % retained on screen) | Control | Fines from Control | Compacted, Comminuted, Size Classified | 75% wt Control 25% wt Roll Compacted Comminuted, Size Classified Blended |
|---|---|---|---|---|
| +12 mesh(+1680 micron) | 0.3 | not tested | 2.2 | not tested |
| +20 mesh(+840 micron) | 50.0 | not tested | 58.0 | not tested |
| +40 mesh(+420 micron) | 42.6 | 25.2 | 37.1 | not tested |
| +60 mesh(+250 micron) | 6.1 | 7.9 | 2.0 | not tested |
| +100 mesh(+149 micron) | 1.0 | 7.8 | 0.7 | not tested |
| +200 mesh(+74 micron) | 0.5 | 24.5 | 0.0 | not tested |
| +325 mesh(+44 micron) | 0.0 | 24.9 | 0.0 | not tested |
| −325 mesh(−44 micron) | 0.0 | 9.7 | 0.0 | not tested |
| Wt % Moisture | 10.0 | 7.5 | 7.5 | not tested |
| Bulk Density (lb/cuft) | 70.5 | 28.7 (loose) 71.8 (tapped) | 58.0 | not tested |
| Dry Clump (lbs) | 4.8 | not applicable | — | 11.1 |

Example 3

A bentonite-containing material containing fines (99.7 wt % having a size less than 200 U.S. mesh) were taken from a commercial manufacturing process for a bentonite-containing clumping cat litter. The chemical composition of these bentonite fines was substantially sodium bentonite with minor amounts of zeolite and calcium montmorillonite. The moisture, bulk density, and particle size distribution of these bentonite fines are reported in Table 3. The bentonite fines were fed to the feed hopper of a Hosakawa Bepex MS-60 Roll Compactor where a cylindrical feed screw predensified (generally a pressure of up to about 100 psig)

the bentonite fines as they are metered to the compacting rolls. The compacting rolls had a 5 inch face with a closed-end, fluted, peak-to-peak surface pattern on 20 inch diameter rolls which rotated at about 5.5 rpm with an opening of 0.060 inches at the nip. A hydraulic pressure of 3500 psig, (equivalent to a hydraulic force of 28,000 pli) was applied to form the compacted sticks at a rate of about 2010 pounds/hour. The compacted sticks were cigar-shaped and were approximately 4 inch long and ⅝ inch in diameter and exhibited an average density of 1.97 g/cc. Following compaction the materials were granulated using a Jacobson Flake Breaker for the initial grinding and an Hosakawa Bepex RD-8 Disintegrator for the majority of the size reduction. The RD-8 employed 24 blunt edged blades rotating at 1250 rpm inside a cage with 0.375 inch openings.

The granulated product made from the compacted bentonite fines were then screened using a 48 inch Kason Dual Deck Vibrating Screener equipped with 12 mesh MG and 20 mesh MG screens. These screen mesh sizes were selected to produce a nominal −12/+40 mesh product. The undersized particles (passing through the 20 mesh MG) were vertically conveyed via a bucket elevator as recycle and combined with incoming feed in the feed hopper at a weight ratio of 1.19 recycle:feed. The oversized particles (retained on 12 mesh MG) were recycled back to the RD-8 Disintegrator for further size reduction. The granular product retained between the two screens, was collected and discharged from the screener. Moisture, bulk density, and particle size distribution of the final product according to this invention is reported in Table 3.

The data in Table 3 demonstrate that the compacted/granulated product made from manufacturing fines had dry clump strength equivalent to the naturally mined (mined, dried, granulated, and size classified) commercial animal litter. Further, it was observed that the compacted bentonite litter had a lower attrition than the naturally mined bentonite particles which suggests that it is slightly harder than the naturally mined product when the compacted particles are formed of bentonite fines roll compacted at the 28,000 pli used in this example.

Example 4

A bentonite-containing material containing about 80 wt % bentonite fines was obtained from Wyo-Ben, Inc., Billings, Mont. designated as IOP (Iron Ore Pelletizing) Bentonite Grade and sold as having the chemical and physical characteristics set forth in Table A, and as being a sodium bentonite. Moisture, bulk density, and particle size distribution of this bentonite-containing material are reported in Table 4. The IOP bentonite was processed by the roll compacting process described in Example 2 and the other process followed, except that feed rate of the bentonite fines through the rolls was increased to 2640 pounds/hour. The compacted sticks exhibited an average density ranging from 1.92 to 2.03 g/cc. The undersized particles were combined with incoming feed at the feed hopper at a weight ratio of 1.75 (recycle): (IOP bentonite feed).

The data in Table 4 demonstrates that the compacted/granulated product made from Wyo-Ben IOP sodium bentonite gave substantially higher dry clump strength versus a typical naturally mined sodium bentonite of similar chemical composition and particle size distribution.

TABLE 3

| Particle Size Dist. (wt % retained on screen) | Control (Commercial Product) | Bentonite-containing fines | Roll Compacted, Comminuted, Size Classified Fines | 95 wt % Control + 5 wt % Compacted Product | 90 wt % Control + 10 wt % Compacted Bentonite Fines |
|---|---|---|---|---|---|
| +12 mesh(+1680 micron) | 3.7 | not tested | 0.0 | not tested | not tested |
| +20 mesh(+840 micron) | not tested | not tested | 78.2 | not tested | not tested |
| +25 mesh(+710 micron) | 52.1 | not tested | not tested | not tested | not tested |
| +40 mesh(+420 micron) | 3 6.8 | not tested | 21.5 | not tested | not tested |
| +100 mesh(+149 micron) | 6.5 | not tested | 0.3 | not tested | not tested |
| +200 mesh(+74 micron) | 0.9 | 0.3 | 0.0 | not tested | not tested |
| −200 mesh(−74 micron) | 0.0 | 99.7 | 0.0 | not tested | not tested |
| Wt % Moisture | 7.3 | not tested | 6.5 | not tested | not tested |
| Bulk Density, (lb/cuft) | 64.0 | 30.2 (loose) | 61.8 | not tested | not tested |
| Dry Clump (lbs) | 2.5 | not applicable | 2.6 | 3.0 | 3.7 |

TABLE 4

| Particle Size Dist. (wt % retained on screen) | Control (Sodium Bentonite: Clumping Cat Litter) | Wyo-Ben IOP Bentonite Fines (Sodium Bentonite) | Roll Compacted Comminuted, Size Classified Bentonite Fines |
|---|---|---|---|
| +12 mesh(+1680 micron) | 0.2 | not tested | 0.0 |
| +14 mesh(+1410 micron) | 4.5 | not tested | not tested |
| +20 mesh(+840 micron) | not tested | not tested | 79.8 |
| +25 mesh(+710 micron) | 60.0 | not tested | not tested |
| +40 mesh(+420 micron) | 32.1 | not tested | 20.1 |
| +60 mesh(+250 micron) | not tested | not tested | not tested |
| +100 mesh(+149 micron) | 3.1 | 4.8 | 0.1 |
| +200 mesh(+74 micron) | 0.1 | 13.2 | 0.0 |
| −200 mesh(−74 micron) | 0.0 | 86.8 | 0.0 |
| Wt % Moisture | 6.5 | 8.1 | 6.7 |
| Bulk Density (lb/cuft) | 68.8 | 48.2 (loose) | 66.2 |
| Dry Clump (lbs) | 4.8 | not applicable | 48.7 |

Examples 5 and 6

Two naturally mined sodium bentonite materials were used to form a granular material and a material containing bentonite fines were provided as the materials used for Example 5 (BF-1) and Example 6 (BF-2) such that the non-compacted granular and compacted samples to be tested and compared in each example were taken from the exact same geologic strata, whereby any differences in clay chemistry were eliminated as an experimental factor. Sodium bentonite fines from BF-1 (WYO-BEN IOP grade) were created by grinding granular samples to simulate the WYO-BEN IOP product grade. BF-2 sodium bentonite fines were created by grinding granular samples to simulate a −35 U.S. mesh product grade. The BF-1 and BF-2 materials containing bentonite fines were evaluated in a lab-scale roll compaction process. The selected fines were introduced to a Bepex CS-25 feed hopper where a cylindrical feed screw predensified (generally a pressure up to about 100 psig) the material as it was metered to the compacting rolls. The compacting rolls then formed a corrugated sheet product (approx. 2" wide) using a hydraulic pressing force of 1600 psi (equivalent to about 13,340 pli). Following compaction the given compacted bentonite was granulated using a Frieutte Flake Breaker for size reduction. The final granulated, compacted bentonite products were then screened to proper size. The natural granular and the compacted products were sized to eliminate particle size distribution as a factor. All samples were manually screen classified using Tyler pans on a RotoTap into discreet particle size ranges and then re-combined to provide substantially identical particle size distributions prior to clump strength testing. The target particle size range was −12/+40 U.S. mesh (ASTM Series E.11). Tables 5 and 6 show the characterization of each feed (bentonite fines), raw granular litter and compacted litter products, and the final litter products.

The data in Tables 5 and 6 demonstrate that roll compaction of the two bentonite fines into a granular litter provided much higher dry clump strength than the corresponding traditionally-mined, granular litter made from the same sodium bentonite clay and having substantially the same particle size distribution. Dry clump strength more than doubled, although the exact improvement may be higher because the test equipment could not measure the high loads required to break the dry clumps. Although not being bound to any theory, when contrasted to naturally mined granular bentonite, it is thought that the compaction process results in a granular litter providing increased functional surface area upon absorption of aqueous fluids such as urine. This increases the clumping capacity by allowing greater deposition of suspended colloidal particles within the clump to increase the degree of solid bridging between bentonite particles.

TABLE 5

| Particle Size Dist. (wt % retained on screen) | (Naturally Mined Control:BF-1) Screened Bentonite | Raw Feed: BF-1 Fines | Compacted BF-1 Fines | Sized, Compacted BF-1 Fines |
|---|---|---|---|---|
| +8 mesh(+2360 micron) | 0.0 | not tested | 0.1 | 0.0 |
| +12 mesh(+1680 micron) | 0.0 | not tested | 0.1 | 0.0 |
| +20 mesh(+840 micron) | 50.0 | not tested | 64.7 | 50.0 |
| +25 mesh(+710 micron) | 20.0 | not tested | 9.2 | 20.0 |
| +40 mesh(+420 micron) | 30.0 | not tested | 20.0 | 30.0 |
| +100 mesh(+149 micron) | 0.0 | approx 0 | 5.4 | 0.0 |
| +200 mesh(+74 micron) | 0.0 | approx 18 | 0.5 | 0.0 |
| −200 mesh(−74 micron) | 0.0 | approx 82 | 0.0 | 0.0 |
| Wt % Moisture | 6.4 | 7.8 | 7.6 | 7.6 |
| Bulk Density (lb/cuft) | not tested | 43.4 | not tested | not tested |
| Dry Clump (lbs) | 20.5 | not applicable | not tested | >45 |

TABLE 6

| Particle Size Dist. (wt % retained on screen) | (Naturally Mined Control:BF-2) Screened Bentonite | Raw Feed: BF-2 Fines | Compacted BF-2 Fines | Sized, Compacted BF-2 Fines |
|---|---|---|---|---|
| +8 mesh(+2360 micron) | 6.6 | not tested | 1.5 | 0.0 |
| +12 mesh(+1680 micron) | 0.0 | not tested | 0.9 | 0.0 |
| +20 mesh(+840 micron) | 50.0 | not tested | 65.7 | 50.0 |
| +25 mesh(+710 micron) | 20.0 | not tested | 8.4 | 20.0 |
| +40 mesh(+420 micron) | 30.0 | not tested | 18.8 | 30.0 |
| +10 mesh(+149 micron) | 0.0 | approx 25 | 4.2 | 0.0 |
| +200 mesh(+74 micron) | 0.0 | approx 25 | 0.5 | 0.0 |
| −200 mesh(−74 micron) | 0.0 | approx 50 | 0.0 | 0.0 |
| Wt % Moisture | 6.6 | not tested | 6.4 | 6.4 |
| Bulk Density (lb/cuft) | not tested | 59.3 | not tested | not tested |
| Dry Clump (lbs) | 13.4 | not applicable | not tested | >45 |

TABLE 7

| Particle Size Dist. (wt % retained on screen) | (Naturally Mined Control) | Bentonite Fines (Sodium Bentonite) | Roll Compacted, Comminuted Bentonite Fines | Bentonite Fines: Roll Compacted, Comminuted, Size Classified |
|---|---|---|---|---|
| +6 mesh(+3350 micron) | 0.0 | not tested | not tested | 0.0 |
| +7 mesh(+2800 micron) | 11.8 | not tested | 4.3 | 11.8 |
| +8 mesh(+2360 micron) | 19.1 | not tested | not tested | 19.1 |
| +10 mesh(+2000 micron) | 22.7 | not tested | not tested | 22.7 |
| +12 mesh(+1680 micron) | 19.2 | not tested | not tested | 19.2 |
| +14 mesh(+1410 micron) | 13.5 | not tested | 61.7 | 13.5 |
| +16 mesh(+1190 micron) | 8.3 | not tested | not tested | 8.3 |
| +18 mesh(+1000 micron) | 5.4 | not tested | not tested | 5.4 |
| +25 mesh(+710 micron) | 0.0 | not tested | 18.5 | 0.0 |
| +40 mesh(+420 micron) | 0.0 | not tested | 9.1 | 0.0 |
| +80 mesh(+177 micron) | 0.0 | not tested | 2.8 | 0.0 |
| +100 mesh(+149 micron) | 0.0 | 4.8 | 2.0 | 0.0 |
| +200 mesh(+74 micron) | 0.0 | 13.2 | 1.6 | 0.0 |
| −200 mesh(−74 micron) | 0.0 | 86.8 | 0.0 | 0.0 |
| Wt % Moisture | 6.1 | 8.1 | 8.9 | 8.9 |
| Dry Clumps (lbs) | 6.2 | not applicable | not tested | 14.7 |

Example 7

A bentonite-containing material containing bentonite fines was obtained from Wyo-Ben comprising their IOP Bentonite Grade bentonite having the characteristics of a sodium bentonite as set forth in Table A and was processed as described in Examples 5 and 6, except the Frieutte Flake Breaker was operated to generate a preliminary particle size range of about −6/+30 mesh. A control animal litter was generated using naturally mined sodium bentonite clay characterized as being the coarse particles retained on a 40 mesh screen with the 3.5 mesh particles removed. The natural granular control and compacted IOP grade bentonite were then manually screen classified using Tyler pans on a RotoTap into discreet particle size ranges and then re-combined to provide substantially the same mesh size distributions prior to clump strength testing. The target particle size distribution can be characterized as a normal distribution with a peak quantity approximately in the center of a −6/+18 mesh range. Table 7 demonstrates the properties of final granular products, fines feed, and raw and final compacted litter products.

The data in Table 7 indicate that roll compaction of bentonite-containing material containing bentonite fines into a granular litter provided better dry clump strength than a corresponding traditionally-mined granular litter of similar chemistry and substantially the same particle mesh size.

Example 8

The compacted/granulated Wyo-Ben IOP sodium bentonite (containing bentonite fines) of Example 4 and a granular zeolite were used as components in preparing blended animal litters. The granular zeolite was characterized as having a nominal particle size range of −14/+40 U.S. mesh equal to 88 wt %, −40/+100 mesh equal to 10 wt %, a nominal moisture content of 7.5 wt %, and a nominal bulk density of about 52 lbs/cu ft. The naturally occurring zeolite is of the type often included in cat litter products as a blended component, because the zeolite has the ability to absorb ammonia, which is related to litter box odor. Because zeolites are non-clumping in nature (typical dry clump strength of about 0.1 lbs), such are often used as minor components (typically less than 25 wt %), since higher amounts negatively affect dry clump strength. A 100 wt % sodium bentonite sold as a clumping cat litter was also compared. Prior to dry blending the granular natural zeolite, with either the natural granular bentonite or the granulated compacted bentonite of Example 4 to form litter products, each granular product was manually screen classified using Tyler pans on a RotoTap screener into discreet particle size ranges and then re-combined to provide substantially similar particle size distributions prior to dry clump strength testing. The target particle size distribution can be characterized as a normal distribution with peak quantity approximately in the center of a −12/+35 U.S. mesh range. These samples were also compared to a physical blend of the naturally mined bentonite and zeolite of a size of −12/+40 U.S. mesh. Table 8 sets forth the particle mesh size ranges and clump strength of the various litter products.

The results in Table 8 demonstrate that use of roll compacted bentonite materials (containing bentonite fines) as a blended component of a granular litter provided better clump strength than the corresponding traditionally-mined bentonite granular litter formed using the same U.S. mesh sieve size. In this example, granular, non-clumping natural zeolite was blended in amounts of 20 wt % and 40 wt % to form litters which demonstrated higher or good dry clump strength, respectively. As a result of this higher dry clump strength, it is possible to formulate animal litters with higher concentrations of non-dumping materials, such as odor-absorbing zeolite without negatively affecting dry clump strength. Thus, one can improve or maintain dry clump strength of a bentonite litter while replacing a portion of the bentonite with other non-clumping functionally beneficial components to provide improved functionality to the litter by way of odor control, cost reduction, pH control and the like.

absorbency for feline urine are surprising and unexpected in view of the prior art on bentonite-containing animal litter.

TABLE 9

| Wt % of compacted bentonite | Dry Clump Strength (lbs) | Clay wt per 10 mil urine (grams) | Reduction in litter used[1] wt % |
|---|---|---|---|
| 0 | 13.9 | 21.7 | control |
| 20 | >50[2] | 15.7 | 27.6 |
| 40 | >50[2] | 14.9 | 31.3 |
| 60 | >50[2] | 12.5 | 42.4 |
| 80 | >50[2] | 11.3 | 47.9 |
| 10 | >50[2] | 10.8 | 50.2 |

[1]Compared to 100% granular bentonite as control

[2]Dry clump strength exceeded the maximum clump strength measurable by the test.

Example 10

A bentonite-containing material (Wyo-Ben IOP Bentonite Grade: described in Table A) was fed to a roll compaction process. The typical moisture, bulk density, and particle size distribution of these bentonite fines are reported in Table A and in Table 10. The fines were fed to a feed hopper of a Hosakawa Bepex MS-60 Roll Compactor where a cylindrical feed screw predensified (at a pressure of to about 100 psig) as well as metered the bentonite fines to compacting rolls. The MS-60 had a 5 inch face with a closed-end, fluted, peak-to-peak surface pattern on 20 inch diameter rolls which rotated at about 5.5 rpm with an opening of 0.125 inches at the nip. A hydraulic pressure of 3500 psi (equivalent to a hydraulic force of about 28,000 pli) was applied to form compacted sticks at a rate of 2580 pounds/hour. The compacted sticks were cigar-shaped and were approximately 4 inch long and ⅝ inch in diameter and exhibited a density ranging from 1.92 to 2.03 g/cc. Following compaction the materials were granulated using a Jacobson Flake Breaker for the initial grind and an Hosakawa Bepex RD-8 Disintegrator for the majority of the size reduction. The RD-8 employed 24 blunt edged blades rotating at 1500 rpm inside a cage with 0.375 inch openings.

The granulated products were then screened to appropriate size using a 48 inch Kason Dual Deck Vibrating Screener equipped with 8 mesh MG and 20 mesh MG screens. These screen mesh sizes were selected to produce a nominal −8/+30 mesh MG product. The undersized particles (passing through 20 mesh MG) were conveyed via a bucket elevator as recycle and combined with incoming feed at the MS-60

TABLE 8

| Particle Size Dist. (wt % retained on screen) | Commercial Product 100% Bentonite | (Naturally Mined Control: Physical Blend) 80% Bentonite 20% Zeolite | 80 wt % Wyo-Ben IOP Roll Compacted, Comminuted + 20 wt % Zeolite Physical Blend | 60 wt % Wyo-Ben IOP Roll Compacted, Comminuted, + 40 wt % Zeolite Physical Blend |
|---|---|---|---|---|
| +12 mesh(+1680 micron) | 0.0 | 0.3 | 0.0 | 0.0 |
| +14 mesh(+1410 micron) | 18.8 | not tested | 18.8 | 18.8 |
| +16 mesh(+1190 micron) | 18.9 | not tested | 18.9 | 18.9 |
| +18 mesh(+1000 micron) | 18.0 | not tested | 18.0 | 18.0 |
| +20 mesh(+840 micron) | 15.2 | 50.0 | 15.2 | 15.2 |
| +25 mesh(+710 micron) | 11.8 | not tested | 11.8 | 11.8 |
| +30 mesh(+590 micron) | 10.3 | not tested | 10.3 | 10.3 |
| +35 mesh(+500 micron) | 6.9 | not tested | 6.9 | 6.9 |
| +40 mesh(+420 micron) | 0.0 | 42.6 | 0.0 | 0.0 |
| +80 mesh(+177 micron) | 0.0 | not tested | 0.0 | 0.0 |
| +100 mesh(+149 micron) | 0.0 | 7.1 | 0.0 | 0.0 |
| +200 mesh(+74 micron) | 0.0 | 0.5 | 0.0 | 0.0 |
| −200 mesh(−74 micron) | 0.0 | 0.0 | 86.8 | 0.0 |
| Dry Clumps (lbs) | 16.3 | (2 to 5 (typical observed values) not tested | 44.0 | 9.4 |

Example 9

A series of animal litters were prepared by forming physical blends containing increments of 20 wt % of the compacted/granulated Wyo-Ben IOP bentonite of Example 4 and the naturally mined granular bentonite used in Example 8. The dry clump strength and urine absorbency (weight of clay used to absorb 10 milliliters (mils) of feline urine) were measured. The results are set forth in Table 9.

The data in Table 9 demonstrate that a physical blend of 20 wt % of compacted/granulated bentonite and 80 wt % naturally mined granular bentonite provided an animal litter having better dry clump strength than the 100% naturally mined granular litter (both having similar composition and substantially the same particle mesh size.) Further, the results in Table 9 demonstrate that when employing litter containing the compacted/granulated bentonite-containing material of this invention that much less litter is used (by weight) to absorb a 10 milliliter test volume of cat urine than that required when using the 100% naturally mined bentonite control. These increases in dry clump strength and feed hopper at a weight ratio of approximately 0.79 recycle-:feed. The oversized particles (retained on 8 mesh MG) were recycled back to the RD-8 Disintegrator. The granular material retained between the two screens, was collected as product as it discharged from the screener chute and is labeled as "8/30" mesh in Table 10 which shows the moisture, bulk density, and particle size distribution.

A portion of the compacted Wyo-Ben IOP 8/30 particles was further size classified to produce litter products of varying particle size distribution. A portion of the compacted bentonite particle was fed at a rate of about 100 lbs/hour to a 24 inch Sweco Vibratory Screener employing 10 mesh MG and 30 mesh TBC screens to yield a product labeled "10/30" as shown in Table 10. A portion of the 8/30 product was similarly fed to the Sweco screener with 12 mesh MG and 30 mesh TBC screens to yield a product labeled "12/30" as shown in Table 10. These products were compared to a commercial clumping litter formed of 100 wt % sodium bentonite having particle size ranges "12/40" and "8/25", as shown in Table 10. Clump strength and moisture absorbency tests were conducted and are reported in Table 10.

A comparison of clump strength values of the commercial product 12/40 versus the compacted Wyo-Ben IOP 10/30 bentonite of this invention that much less litter is used by weight to absorb 10 mils of feline urine than the weight used when 100% naturally mined bentonite is used as the litter material.

The data in Table 10 demonstrate that for a given litter type, finer particle size distributions generally result in better clump strength and absorbency versus coarser particle size distributions. However, if desired, use of compacted bentonite fines in animal litters according to this invention rather than naturally mined bentonite litters permits use of coarser particle size distributions in the final litter while still providing acceptable dry clump strength and urine absorbing capacity. Such coarser particle size distributions are often desirable in providing heavier particles which have a lower tendency to be held in a cat's fur and be tracked from a litter box.

TABLE 10

| Particle Size Dist. (wt % retained on screen) | Commercial Control: 12/40 Mesh | Naturally Mined Control: 8/25 Mesh | Wyo-Ben IOP Bentonite | Roll Compacted WYO-Ben IOP Bentonite | 10/30 Mesh Roll Compacted | 12/30 Mesh Roll Compacted |
|---|---|---|---|---|---|---|
| +8 mesh(+2360 micron) | 0.1 | 3.2 | not tested | 0.2 | not tested | not tested |
| +10 mesh(+200 micron) | not tested | not tested | not tested | 17.3 | 0.0 | not tested |
| +12 mesh(+1680 micron) | not tested | 45.10.3 | not tested | 24.60.0 | 4.0 | 0.0 |
| +14 mesh(+1410 micron) | 8.5 | not tested | not tested | not tested | not tested | 18.8 |
| +16 mesh(+1190 micron) | not tested | 2.9 | not tested | 33.3 | 45.5 | 17.7 |
| +20 mesh(+840 micron) | not tested | 16.0 | not tested | 17.3 | 36.1 | 56.6 |
| +25 mesh(+710 micron) | 46.4 | 4.7 | not tested | 4.7 | 9.5 | 16.5 |
| +30 mesh(+590 micron) | not tested | 25.9 | not tested | 1.19 | 4.0 | 7.4 |
| +40 mesh(+420 micron) | 29.1 | not tested | not tested | not tested | not tested | not tested |
| +50 mesh(+297 micron) | 12.9 | not tested | not tested | not tested | not tested | not tested |
| +70 mesh(+210 micron) | not tested | not tested | 2.4 | not tested | not tested | not tested |
| +100 mesh(+149 micron) | 2.4 | not tested | 2.5 | not tested | not tested | not tested |
| +200 mesh(+74 micron) | not tested | not tested | 13.6 | not tested | not tested | not tested |
| +325 mesh(+44 micron) | not tested | not tested | 18.7 | not tested | not tested | not tested |
| +400 mesh(+37 micron) | not tested | not tested | 9.3 | not tested | not tested | not tested |
| pan | 0.6 | 0.3 | 53.5 | 0.7 | 0.9 | 1.8 |
| Bulk Density (lb/cu ft) | 69.2 | 66.5 | (loose) 47.9 | 62.4 | not tested | not tested |
| Wt % Moisture | 6.8 | 8.0 | 8.1 | 5.7 | not tested | not tested |
| Dry Clumps (lbs) | 29.9 | 7.3 | not applicable | 20.3 | >50 | >50 |
| Absorbency clay wt (grams) per 10 mils cat urine | 26.8 | 29.8 | not applicable | 18.9 | 14.2 | 12.4 |

and 12/30 demonstrates that roll compaction of the bentonite fines into a granular litter provides improved clump strength when compared with the traditionally-mined granular litter. Similarly, a comparison of clump strength of the commercial 8/25 litter versus the compacted Wyo-Ben IOP 8/30 of this invention demonstrates that roll compaction of bentonite fines into a granular litter provides improved clump strength when compared with the corresponding traditionally-mined granular litter. The data in Table 10 also demonstrate that when employing litter containing the compacted/granulated Example 11

The cat urine absorbency of the compacted/granulated litters of Example 10 were compared to the absorbency of several commercially available clay-based cat litters sold as "clumping cat litters."

This data indicates that when employing litter containing the compacted/granulated bentonite of this invention that much less litter is used by weight to absorb 10 mils of cat urine.

TABLE 11

| Product | Composition | Approx particle size (mesh range) | Wt use to absorb 10 mil urine grams |
|---|---|---|---|
| Fresh Step Scoopable[1] | sodium bentonite | 16/40 | 33.4 |
| Tidy Scoop[1] | sodium bentonite, calcium montmorillonite, attapulgite | 12/40 | 30.5 |

TABLE 11-continued

| Product | Composition | Approx particle size (mesh range) | Wt use to absorb 10 mil urine grams |
|---|---|---|---|
| Compacted Wyo-Ben IOP 8/30 (example 10) | sodium bentonite | 8/30 | 18.9 |
| Compacted Wyo-Ben IOP 10/30 (example 10) | sodium bentonite | 10/30 | 14.2 |
| Compacted Wyo-Ben IOP 12/30 (example 10) | sodium bentonite | 12/30 | 12.4 |

[1]Commercially available clumping cat litters with the clays believed to be used in their formulation.

I claim:

1. An animal litter comprising at least 5% by weight of a water-swellable bentonite-containing material containing a compacted bentonite formed by compacting bentonite-containing particles having an effective amount of said particles smaller than 100 U.S. mesh, said particles having a moisture content between about 5% by weight and about 15% by weight, based on the total weight of water and bentonite, said particles compacted under effective compacting pressure to form compacted masses of said bentonite particles and forming said compacted masses into particles having an appropriate size for use as an animal litter.

2. An animal litter according to claim 1 wherein said bentonite particles have at least 30 weight percent of said particles less than 200 U.S. mesh.

3. An animal litter according to claim 2 wherein said bentonite is a sodium bentonite and is at least 50 wt % montmorillonite.

4. An animal litter according to claim 1 wherein the animal litter formed has particles in the 12/40 U.S. mesh range.

5. An animal litter according to claim 1 wherein the animal litter formed has particles in the 8/25 U.S. mesh range.

6. An animal litter according to claim 1 wherein said bentonite particles have been roll compacted between spaced apart rolls under a pressure of at least 5,000 pounds per lineal inch.

7. An animal litter according to claim 1 wherein the bentonite to be compacted has a moisture content of from 5 wt % to 10 wt %.

8. An animal litter according to claim 1 wherein at least one additional absorbent material is added in an amount between about 5 wt % and about 60 wt %, based on the total weight of said animal litter.

9. An animal litter according to claim 1 wherein said litter provides an absorbency for animal urine greater than the comparable absorbency obtained from animal litter derived from a similar non-compacted bentonite.

10. An animal litter according to claim 6 comprising compacting said bentonite particles between rolls under an effective compacting pressure of at least 10,000 pounds per lineal inch.

11. An animal litter according to claim 10 wherein said effective roll compaction pressure is at least about 20,000 pounds per lineal inch.

12. An animal litter according to claim 1 wherein the compaction is performed under an effective compacting pressure of at least about 1,000 pounds per square inch gauge.

13. An animal litter according to claim 1 wherein said water-swellable bentonite-containing materials are at least 30 wt % fines from a manufacturing process for the manufacture of animal litter, said fines containing non-compacted bentonite.

14. An animal litter according to claim 1 wherein said animal litter comprises at least 50% by weight bentonite-containing material, compacted under effective roll compacting pressures from bentonite particles with at least 30 wt % of the particles having a size less than about 200 U.S. mesh.

15. An animal litter according to claim 13 wherein at least about 80 wt % of said bentonite-containing material have a size less than 200 U.S. mesh.

16. An animal litter according to claim 8 wherein said additional absorbent material is selected from the group consisting of zeolites, fullers earth, attapulgite, diatomaceous earth, absorbent organic polymers, cellulosics, and mixtures thereof.

17. An animal litter according to claim 1 wherein said bentonite-containing material contains bentonite fines from a manufacturing process for bentonite-containing absorbents wherein said bentonite fines are derived from attrition during manufacturing of both compacted bentonite-containing absorbent and non-compacted bentonite absorbent.

18. An animal litter according to claim 1 wherein said litter contains at least 20 wt % non-compacted bentonite and at least 20 wt % compacted bentonite.

19. An animal litter according to claim 1 wherein said litter contains an effective amount of an additive selected from the group consisting of perfumes, deodorants, odor absorbents, antimicrobial agents, disinfectants, colorants, pesticides, pH-control agents, desiccants, perborates, chemical oxidants and mixtures thereof.

20. An animal litter according to claim 1 wherein said compacted bentonite contains no adhesive binder.

21. An animal litter according to claim 9 wherein said compacted bentonite contains no adhesive binder.

22. An animal litter according to claim 1 wherein said bentonite particles are compacted by a compaction process selected from the group consisting of roll compaction, roll briquetting, vertical hydraulic pressing, flat plate pelletizing, rotary tableting and gear pelleting.

23. An animal litter according to claim 22 wherein said compaction process employs an effective compaction pressure of at least 1000 pounds per square inch.

24. The animal litter of claim 1, wherein the animal litter has a particle size for use as an animal litter selected from the group consisting of U.S. mesh size distributions 12/40, 8/25, 8/30, 12/30 or 16/40.

25. An animal litter having liquid absorbency for animal urine comprising an effective amount of water-swellable bentonite particles containing an effective amount of compacted bentonite fines having an effective moisture content and compacted under an effective compacting pressure correlated to said effective moisture content to provide an animal litter for use in a litter box, said litter having a size suitable for use in a litter box and capable of agglomerating upon wetting into a clump of sufficient size and clump strength for physical removal of the agglomerated mass from the litter box.

26. An animal litter according to claim 25 comprising an absorbent composition capable of agglomerating upon wetting into a clump of sufficient size and of sufficient clumping strength for physical removal of the clump from the litter, said clump capable of being removed from the litter box as a wet clump or after drying at room temperature for about 24 hours, said animal litter comprising at least about 5% by weight water-swellable bentonite particles formed by roll compacting under effective roll compacting pressures of at least 10,000 pli, said bentonite particles which are compacted having at least 30 weight percent of said bentonite particles of a size less than 100 U.S. mesh.

27. An animal litter comprising an effective absorbent amount of water-swellable bentonite-containing particles containing a compacted bentonite formed by roll compacting bentonite-containing particles having at least 30 wt. % of said particles smaller than 100 U.S. mesh, having a moisture content between about 5% by weight and about 15% by weight, based on the total weight of water and bentonite, under an effective roll compacting pressure of at least 5000 pli to form compacted bentonite-containing masses and forming said compacted masses into particles having an appropriate size for use as an animal litter.

28. An animal litter according to claim 27 wherein said bentonite-containing material is a sodium bentonite.

29. An animal litter according to claim 27 wherein said bentonite particles have been roll compacted between rolls under a pressure of at least 20,000 pounds per lineal inch.

30. An animal litter according to claim 29 wherein said pressure is at least 20,000 and said bentonite is at least 50% montmorillonite.

31. An animal litter according to claim 27 wherein the animal litter formed has particles in the 12/40 U.S. mesh range.

32. An animal litter according to claim 27 wherein the animal litter formed has particles in the 8/25 U.S. mesh range.

33. An animal litter according to claim 27 wherein the bentonite-containing particles to be compacted have a moisture content between about 5 wt % and about 10 wt %.

34. An animal litter according to claim 27 wherein at least one additional additive is added in an amount between about 5 wt % to about 60 wt %, based on the total weight of said animal litter.

35. An animal litter according to claim 27 wherein said animal litter has a feline urine absorbency greater than the comparable feline urine absorbency obtained from a similar non-compacted bentonite-containing litter.

36. An animal litter according to claim 27 comprising compacting said bentonite particles between spaced apart rollers under an effective compacting pressure of at least 28,000 pounds pli.

37. An animal litter according to claim 27 wherein the compaction is performed using rollers having surface designs which form cigar-shaped compacted bentonite-containing material.

38. An animal litter according to claim 27 wherein said water-swellable bentonite-containing materials comprise bentonite-containing fines from a manufacturing process for the manufacture of animal litter.

39. An animal litter according to claim 27 wherein said litter comprises at least 30% by weight compacted bentonite, compacted under effective roll compacting pressures from bentonite particles comprising particles with at least 30 wt % of the particles having a size less than 200 U.S. mesh.

40. An animal litter according to claim 39 wherein at least about 80 wt % of said particles have a size less than 200 U.S. mesh.

41. An animal litter according to claim 34 wherein said additive is selected from the group consisting of zeolites, fullers earth, attapulgite, diatomaceous earth, absorbent organic polymers, cellulosics, and mixtures thereof.

42. An animal litter according to claim 38 wherein said bentonite-containing particles to be compacted include fines from a manufacturing process for bentonite-containing animal litters wherein said bentonite-containing particles have at least 30% by weight of the particles having a size less than 200 U.S. mesh and contain bentonite-containing fines derived from the attrition during manufacturing of both compacted bentonite and non-compacted bentonite.

43. An animal litter according to claim 42 wherein at least 80 wt % of said bentonite particles to be compacted have a size less than 200 U.S. mesh.

44. An animal litter according to claim 27 wherein said compacted bentonite contains no adhesive binder.

45. An animal litter according to claim 42 wherein said compacted litter contains no adhesive binder.

46. An animal litter according to claim 27 having improved liquid absorbency and dry clump strength formed from compacted bentonite particles for use in a litter box and having a size suitable for use in a litter box and capable of agglomerating upon wetting into a clump of sufficient size for physical removal of the clump from the litter box.

47. The animal litter of claim 27, wherein the animal litter has a particle size for use as an animal litter selected from the group consisting of U.S. mesh size distributions 12/40, 8/25, 8/30, 12/30 or 16/40.

48. An animal litter according to claim 27 comprising an absorbent composition capable of agglomerating upon wetting into a clump having sufficient size and of sufficient clumping strength for physical removal of the clump from the litter, said clump capable of being removed from the litter box as a wet clump or after drying at room temperature for at least 24 hours, said animal litter comprising at least about 5 wt % compacted bentonite particles formed by roll compacting under effective roll compacting pressures.

49. The method of selectively removing liquid animal wastes from a weight of animal litter comprising:

contacting the animal litter of claim 1 with liquid animal waste thereby producing a clump comprising the animal litter and the liquid animal waste that is of sufficient size and of sufficient strength to be removed from the litter and the remaining amount of litter; and removing the clump from the remaining amount of litter as a wet clump or after said clump has dried at room temperature for a period of time, thereby removing the liquid animal waste from the remaining amount of litter.

50. The method of selectively removing liquid animal wastes from a weight of animal litter comprising:

contacting the animal litter of claim 27 with liquid animal waste thereby producing a clump comprising the animal litter and the liquid animal waste that is of sufficient size and of sufficient strength to be removed from the litter and the remaining amount of litter; and removing the clump from the remaining amount of litter as a wet clump or after said clump has dried at room temperature for a period of time, thereby removing the liquid animal waste from the remaining amount of litter.

51. A litter box comprising a water-impermeable receptacle having disposed therein the animal litter of claim 1, capable of agglomerating upon wetting into a clump of sufficient size and of sufficient clumping strength for physical removal of the clump from the litter box.

52. A litter box comprising a water-impermeable receptacle having disposed therein an animal litter containing a water-swellable bentonite capable of agglomerating upon wetting into a mass of sufficient size and of sufficient clump strength for physical removal of the agglomerated mass from the litter box without substantial adherence to an animal, said agglomerated mass capable of being removed from the litter box after drying at room temperature for about 24 hours, said animal litter comprising at least about 5% by weight bentonite particles compacted under effective compacting pressure from particles containing an effective amount of bentonite fines to form masses which are ground and sized after compacting to have a particle size suitable for use of an animal litter.

53. A litter box according to claim 52 comprising a water-impermeable receptacle having disposed therein a compacted water-swellable bentonite having a sodium bentonite to calcium bentonite ratio greater than one.

54. An animal litter comprising a compacted water-swellable sodium bentonite capable of agglomerating upon wetting with feline urine into a clump of sufficient size and of sufficient clump strength for physical removal of the clump from the litter box, said animal litter comprising at least about 5% by weight particles of compacted bentonite formed by compacting particles having at least 30 wt % of said particles of a size less than 200 U.S. mesh; said animal litter having a particle size after compacting and sizing suitable for use as a clumping animal litter so as to form clumps when wetted with feline urine.

55. An animal litter according to claim 54 wherein said compacted particles comprise at least 59 wt % particles of a size less than 100 U.S. mesh.

56. An animal litter according to claim 54 wherein compacted particles comprise at least 36.1 wt % particles of a size less than 200 U.S. mesh and said clumps are capable of being removed from the litter box substantially as a formed clump without substantial removal of unwetted animal litter particles.

57. An absorbent comprising a water-swellable bentonite-containing material, said material formed by compacting under effective compacting pressure bentonite-containing particles having an effective amount of said particles smaller than 100 U.S. mesh, such particles having a moisture content between about 5% by weight and about 15% by weight, based on the total weight of water and bentonite, to form compacted masses of said bentonite particles and forming said compacted masses into particles having an appropriate size for use as an absorbent.

58. An absorbent according to claim 57 wherein said bentonite is sodium bentonite.

59. An absorbent according to claim 58 wherein said bentonite is at least 50% montmorillonite.

60. An absorbent according to claim 57 wherein the size of the absorbent particles is in the 12/40 U.S. mesh range.

61. An absorbent according to claim 57 wherein the size of the absorbent particles is in the 8/25 U.S. mesh range.

62. An absorbent according to claim 57 wherein said bentonite particles have been roll compacted between spaced apart rolls under a pressure of at least 5,000 pounds per lineal inch.

63. An absorbent according to claim 57 wherein the bentonite particles to be compacted have a moisture content of from 5 wt % to 10 wt %.

64. An absorbent according to claim 57 wherein at least one additional absorbent material is added in an amount between about 5 wt % to about 60 wt %, based on the total weight of said absorbent.

65. An absorbent according to claim 57 wherein said compacted bentonite absorbent provides a water absorbency greater than the comparable water absorbency obtained from a non-compacted bentonite absorbent.

66. An absorbent according to claim 62 comprising compacting said bentonite particles between rollers under an effective compacting pressure of at least 10,000 pounds per lineal inch.

67. An absorbent according to claim 66 wherein said effective roll compaction pressure is at least about 20,000 pounds per lineal inch.

68. An absorbent according to claim 57 wherein the compaction is performed under an effective compacting pressure of at least about 1,000 pounds per square inch gauge.

69. An absorbent according to claim 57 wherein said water-swellable bentonite-containing material contains fines from a manufacturing process for the manufacture of an absorbent, said fines containing non-compacted bentonite fines.

70. An absorbent according to claim 57 wherein said absorbent comprises at least 50 wt % compacted bentonite, compacted under effective roll compacting pressures from bentonite particles having at least 30 wt % of the particles having a size less than about 200 U.S. mesh.

71. An absorbent according to claim 70 wherein at least about 30 wt % of said bentonite fines have a size less than about 200 U.S. mesh.

72. An absorbent according to claim 64 wherein said additional absorbent material is selected from the group consisting of zeolites, fullers earth, attapulgite, diatomaceous earth, absorbent organic polymers, cellulosics, and mixtures thereof.

73. An absorbent according to claim 57 wherein said bentonite particles to be compacted contain bentonite fines from a manufacturing process for a bentonite-containing absorbent wherein said bentonite particles are derived from attrition during manufacturing of both compacted bentonite and non-compacted bentonite-containing absorbents.

74. An absorbent according to claim 73 wherein said absorbent comprises at least 25 wt % of a compacted bentonite and up to 75 wt % of a non-compacted bentonite, said compacted bentonite being compacted by roll compaction at a pressure of at least 10,000 pounds per lineal inch, from bentonite particles having between about 5 wt % and about 15 wt % water and having at least 30 wt % of said bentonite particles having a size less than 100 U.S. mesh.

75. An absorbent according to claim 74 wherein at least 30 wt % of said bentonite particles to be compacted have a size less than 200 U.S. mesh.

76. An absorbent according to claim 57 wherein said compacted bentonite contains no adhesive binder.

77. An absorbent according to claim 74 wherein said compacted bentonite contains no adhesive binder.

78. An absorbent according to claim 57 wherein said compacted bentonite is compacted by a compaction process selected from the group consisting of roll compaction, roll briquetting, vertical hydraulic pressing, flat plate pelletizing, rotary tableting and gear pelleting.

79. An absorbent according to claim 78 wherein said compaction process employs an effective compaction pressure of at least 1000 pounds per square inch.

80. An absorbent comprising at least 5 wt % of a compacted water-swellable sodium bentonite formed by roll compacting sodium bentonite particles having at least 30 wt % of said particles smaller than 200 U.S. mesh, said particles having a moisture content between about 5 wt % and about 15 wt %, based on the total weight of water and bentonite, said compacting being under an effective roll compacting pressure of at least 5000 pli to form compacted bentonite-containing masses and forming said compacted masses into particles having an appropriate size for use as an absorbent.

81. An absorbent according to claim 80 wherein said sodium bentonite is at least 50 wt % montmorillonite.

82. An absorbent according to claim 80 wherein said bentonite particles have been roll compacted between rolls under a pressure of at least 10,000 pounds per lineal inch.

83. An absorbent according to claim 80 wherein said pressure is at least 20,000 and said bentonite is at least 50% montmorillonite.

84. An absorbent according to claim 80 wherein the bentonite to be compacted has a moisture content of from 5% to 10% by weight.

85. An absorbent according to claim 80 wherein at least one additional non-absorbent additive is added in an amount between about 0.5% to about 20% by weight, based on the total weight of said absorbent.

86. An absorbent according to claim 82 comprising compacting said bentonite particles between rollers under an effective roll compacting pressure of at least 28,000 pounds pli.

87. An absorbent according to claim 80 wherein the compaction is performed using rollers having surface designs which form cigar-shaped compacted masses.

88. An absorbent according to claim 80 wherein said sodium bentonite comprises fines from a manufacturing process for the manufacture of said absorbent, said fines containing fines from the manufacture of absorbents containing compacted bentonite.

89. An absorbent according to claim 80 wherein said absorbent comprises at least 20% by weight compacted bentonite, compacted under effective roll compacting pressures from a material containing bentonite fines with at least 30% by weight of the particles having a size less than 200 U.S. mesh.

90. An absorbent according to claim 89 wherein at least about 80 wt % of said bentonite-containing fines have a size less than 200 U.S. mesh.

91. An absorbent according to claim 85 wherein said additive is selected from the group consisting of zeolites, fullers earth, attapulgite, diatomaceous earth, absorbent organic polymers, cellulosics, and mixtures thereof.

92. An absorbent according to claim 57 wherein said bentonite-containing particles are derived from a manufacturing process for bentonite-containing animal litters wherein said bentonite-containing particles have at least 30% by weight of the particles having a size less than 200 U.S. mesh and contain particles derived from attrition during manufacturing of an absorbent containing both compacted bentonite and non-compacted bentonite.

* * * * *